Figure 1:
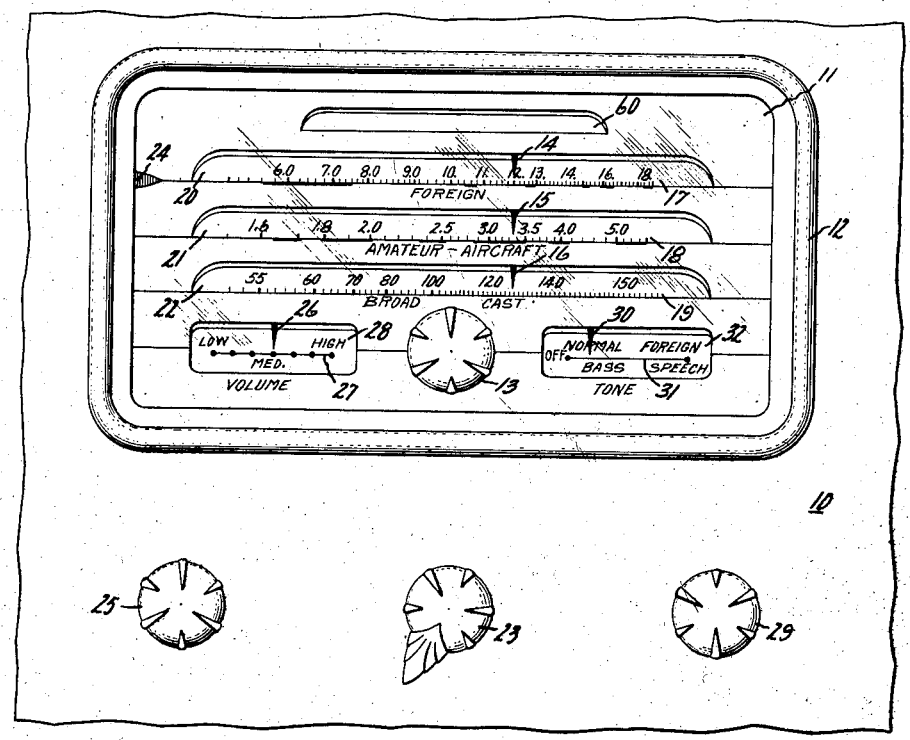

Feb. 7, 1939. G. A. BECK 2,146,558
DIAL INDICATOR
Filed Jan. 14, 1938 2 Sheets-Sheet 1

Inventor:
George A. Beck,
by Harry E. Dunham
His Attorney.

Feb. 7, 1939.     G. A. BECK     2,146,558
DIAL INDICATOR
Filed Jan. 14, 1938     2 Sheets-Sheet 2
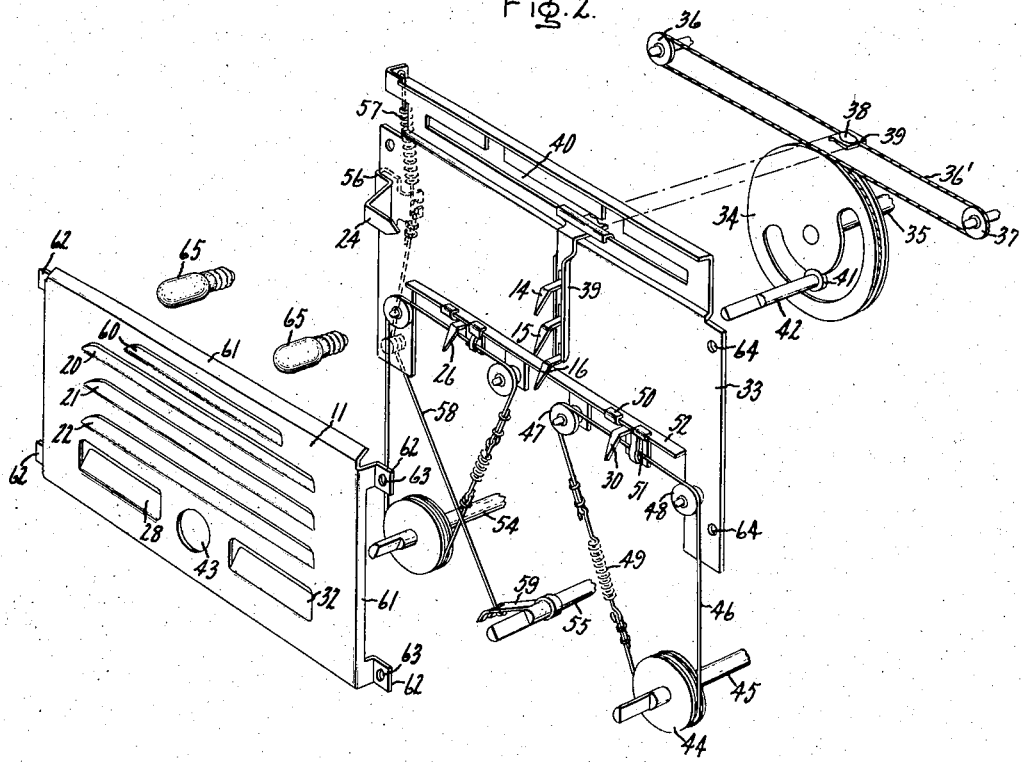
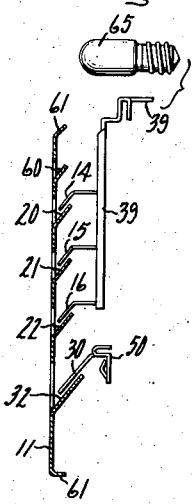
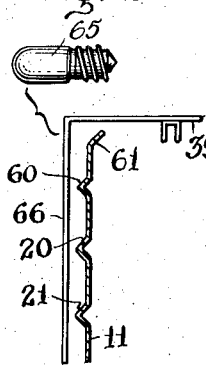
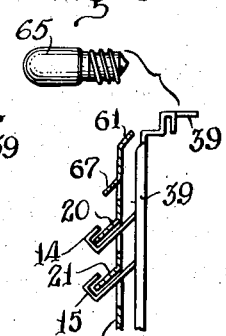
Inventor:
George A. Beck,
by Harry E. Dunham
His Attorney.

Patented Feb. 7, 1939

2,146,558

UNITED STATES PATENT OFFICE 2,146,558

DIAL INDICATOR

George A. Beck, Bridgeport, Conn., assignor to General Electric Company, a corporation of New York Application January 14, 1938, Serial No. 184,999

12 Claims. (Cl. 116—124.1)

My invention relates to improvements in indicators and more particularly to that type of indicator having a dial and a movable indicator member which cooperates with indicia provided on the dial to produce the desired indication. In greater particularity, my invention relates to an improved dial used for indicating the position of a variable element in a signalling apparatus, such as the tuning element of a radio receiver thereby to indicate the frequency, or station, to which the receiver is tuned.

It is an object of my invention to provide an indicator which fulfills to a marked degree the requirement that the indication shall be easily, quickly and accurately readable by an observer either standing and looking down upon the dial or sitting and viewing the dial from a position perpendicular to the dial face.

Another object of my invention is to provide a dial which has indicia bearing surfaces formed from the material of the dial face, a structure which may if desired provide louver-like openings in the dial face through which a movable pointer may cooperate with, and a suitable source may illuminate, indicia formed on the aforesaid surface.

It is a further object of my invention to provide a dial which may be well and pleasingly illuminated by a light source positioned above and in rear of an opaque dial face.

Still a further object of my invention is to accomplish these and other results in a dial having a highly pleasing appearance yet one simple to construct and therefore economical to manufacture.

The novel features which I believe to be characteristic of my invention are set forth with particularity in the appended claims. My invention itself, however, both as to its organization and method of operation together with further objects and advantages thereof may best be understood by reference to the following description taken in connection with the accompanying drawings in which Fig. 1 represents an embodiment of my invention and illustrates the appearance of the dial when mounted in a cabinet structure, Fig. 2 illustrates by a somewhat exploded view the arrangement of parts which constitute my dial mechanism, Fig. 3 represents an elevation in cross-section illustrating the positioning of the indicia bearing surfaces in relation to the indicating pointers and the source of illumination, and Figs. 4 and 5 illustrate modifications of my invention in which the indicia bearing surfaces are formed forwardly of the dial face.

Referring to the drawings, I have illustrated in Fig. 1 the external appearance of my dial when mounted in the control panel 10 of a signalling apparatus, such for example as a radio receiver, with which my dial may be employed. The control panel has a suitable aperture formed therein through which the dial plate 11 may be viewed. An ornamental escutcheon 12 is fitted into the aperture about the dial plate 11 and supports a pane of glass or other transparent material provided to protect the dial face from dust and abrasion.

The radio receiver with which my dial may be used employs a manual tuning control knob 13 by which the frequency response of the receiver may be adjusted over a selected one of several frequency ranges, or tuning bands, here illustrated by way of example as three in number. Adjustment of the tuning control knob 13 causes an index or pointer 14, 15 or 16 to move along a respective tuning scale 17, 18 or 19 provided on the louver-like panels 20, 21 or 22 which are formed in the face of the dial plate 11. The selection of a desired one of the three tuning bands is accomplished by the band control knob 23, the adjustment of which is indicated by a movable indicator or pointer 24 which moves to one of three positions respectively opposite the tuning scales 17, 18 and 19. The volume output of the radio receiver is adjusted by the volume control knob 25, the adjustment of which is indicated by the relative position of the indicator or pointer 26 in its movement along a suitable scale 27 provided on the louver-like panel 28. The audio frequency response of the receiver is adjusted by the tone control knob 29 and the relative adjustment thereof is indicated by the position of a pointer 30 in its movement over a scale 31 provided on the louver-like panel 32.

Referring to Fig. 2 of the drawings, I have shown a somewhat exploded view of the mechanism for operating the various indices or pointers. The dial plate 11 with its several indicia bearing louvers is shown at the left of the figure. In the center of the figure is shown a base plate 33 upon which are mounted the various movable indices 14, 15, 16, 24, 26, and 30, each associated with a suitable mechanism whereby it is operated. At the right of the figure is shown a pulley 34 mounted upon the shaft 35 of an adjustable condenser, not shown, provided for purposes of tuning the receiver. A cable 36' extends around the pulley 34, operates over idler pulleys 36 and 37, and has secured to it as at 38 a member 39 which carries the respective indices 14, 15 and 16. The member 39 is arranged to slide upon the lower edge of an elongated slot 40 cut in the upper portion of the base plate 33. It will be evident that as the pulley 34 and the attached tuning condenser, not shown, are rotated, the member 39 slides along the edge of the slot 40 and carries the indices 14, 15 and 16 along their respective dial scales 17, 18 and 19 of Fig. 1 to positions corresponding to the instant adjustment of the tuning condenser. The pulley 34 is driven by engagement with a gear 41 mounted on a shaft 42. This shaft is journaled in bearings, not shown, and extends through an aperture 43 in the dial plate 11 to support on its left end a suitable handle such as the knob 13 of Fig. 1 which may be grasped by the operator in effecting the desired tuning adjustment of the receiver.

In the lower right hand corner of Fig. 2 is shown a pulley 44 fixedly secured on a shaft 45 which extends rearwardly to operate the tone control elements, not shown, provided for purposes of adjusting the audio frequency response, or tone adjustment, of the receiver. A cable 46 extends around the pulley 44 and over the idling pulleys 47 and 48, a coiled spring 49 being secured between the ends of the cable to maintain the latter under tension. The pointer 30 is supported by a member 50 secured to the cable 46 as at 51 and arranged to slide along the upturned lower edge 52 of the base plate 33. As the pulley 44, the shaft 45 and the connected tone control elements, not shown, rotate in adjusting the tone response of the receiver, the member 50 slides along the edge 52 of the base plate 33 and moves the pointer 30 along the scale 31 of Fig. 1. The left end of the shaft 45 extends through an aperture, not shown, in the control panel 10 and has secured thereon the knob 29 which the operator may grasp in making an adjustment of the tone quality of the receiver.

The volume adjustment of the radio receiver is controlled by movement of the control shaft 54, shown near the center of Fig. 2, which is mechanically connected to the volume control elements, not shown, of the receiver. A relative adjustment of the shaft 54 in adjusting the volume output is indicated by a linear displacement of the pointer 26 along the volume scale 27 of Fig. 1. The mechanical connection between the volume control shaft 54 and the pointer 26 is a duplicate of that interconnecting the tone control shaft 45 and its indicating pointer 30, as is clearly evident from the drawings, and no further description in this respect is deemed necessary. The left hand end of the shaft 54 extends through an orifice, not shown, in the panel 10 and has secured thereon the manually adjustable knob 25 of Fig. 1.

The frequency band selector control shaft 55, shown near the center bottom of Fig. 2 extends rearwardly to be connected to elements, not shown, of the radio receiver which determine the frequency band over which the receiver will tune. The control shaft 55 extends through an aperture, not shown, in the control panel 10 and carries on its forward end the knob 23 of Fig. 1 which may be grasped by the operator in effecting a desired band adjustment. The frequency band selector elements, not shown, move with the shaft 55 to three selectable positions corresponding to one of the three tuning bands over which the apparatus may be tuned. The relative position to which the shaft 55 has been adjusted is indicated by a pointer 24 as it moves vertically along the edge of the dial plate 11 to one of three positions respectively opposite the tuning scales 17, 18 and 19 of Fig. 1. To this end, the pointer 24 is supported by a member 56 arranged for vertical reciprocatory motion along one edge of the base plate 33. The member 56 is biased to one end of its travel by a spring 57 and is moved along the path of its reciprocatory motion by a cable 58 which terminates at the end of an arm 59 fixedly secured to the shaft 55. The shaft 55 is maintained in one of three predetermined positions against the bias of the spring 57 by elements of the frequency band control, not shown, of the radio receiver. It is evident that movement of the shaft 55 under control of the manual knob 23 to one of the three selectable band positions causes a corresponding movement of the member 56 and with it the pointer 24 to one of three positions respectively opposite one of the three tuning scales 17, 18 or 19 of Fig. 1.

Considering now in greater detail the construction of the dial plate 11, shown perhaps more clearly in Fig. 2, the most conspicuous single feature of novelty is the arrangement of the louver-like openings formed in the dial plate. The dial plate is preferably formed of opaque sheet material. The several surfaces 20–22 inclusive, 28 and 32, shown somewhat rectangular in shape, are formed from the material of the dial plate by cutting along three sides of each such surface area and by bending backward along a line which marks the fourth side thereby forming a louver-like opening in the dial plate. Each of the surfaces 20–22 inclusive are, as stated above, in reference to Fig. 1, provided with suitable tuning scales or other indicia 17–19 inclusive which may be in the nature of tuning scales for three frequency ranges over which the radio receiver is adapted to operate. Indicia may be placed upon the surface 60 to indicate the manufacturing source of either the dial or the radio receiver with which it is used. And, as previously stated, suitable indicia may be placed upon each surface of the louver-like panels 28 and 32 to provide tone and volume scales respectively.

This louvered-dial construction has several rather distinct and important advantages over the prior dial constructions. First in consideration is the factor of low manufacturing cost brought about by the very simple method of forming the dial plate. The construction, in addition, allows only the useful tip of the several pointers to be visible to an operator and thereby tends to avoid confusion during a tuning operation. It insures that the illumination of the dial, as will presently be pointed out, may be accomplished in an efficient and pleasing manner devoid of all glare. It additionally permits the use of the popular "slide rule" type of linear scale in a dial of exceptionally attractive and pleasing appearance.

The dial plate 11 is preferably stiffened by the provision of a portion 61 along each edge thereof which may, for example, be formed by bending back the edge of the dial plate. The plate 11 may be assembled to the base plate 39 by the provision of supporting feet 62 formed integrally with the stiffening portions 61, each of the feet 62 having an aperture 63 in corresponding relation with an aperture 64 provided in the base plate 33. Securing means, not shown, extend through each of the apertures 63 and 64 and may extend through a bracket, not shown, by which the assembled dial is supported from the chassis of the signalling apparatus.

Suitable illumination for the several indicia bearing surfaces 20–22 inclusive, 28, 32 and 60 is provided by an arrangement of incandescent lamps 65 positioned above and in rear of the dial plate 11. The relative positioning of the incandescent lamps 65 with respect to the several indicia bearing surfaces will be more clearly evident from the drawing of Fig. 3. It should be that the width of the respective surfaces increases as the position of the surface progresses in order from top to bottom of the dial plate 11. Further, the angle which each surface forms with the face of the dial plate 11 may increase in relation to the position which each surface bears in the progressive order of surfaces from top to bottom of the dial plate. With this progressive proportioning of the several surface areas 20–22 inclusive, 28, 32 and 60 and with a suitable positioning of the lamps 65, I have found that the several indicia may be pleasingly and uniformly illuminated. The lamps 65 may and normally will have a constant intensity of illumination, but one or all of these lamps may vary their illumination in response to a tuning operation to provide a tuning indication as, for example, that the radio receiver is accurately tuned to the frequency of a desired signal.

While I have shown the surfaces 20–22 inclusive, 28, 32 and 60 as having been formd by cutting and bending the sheet material from the surface of the dial plate 11, it will be evident that the louver-like openings thus provided in the dial plate may be formed equally well by other than a cutting and bending operation. Thus the several indicia bearing surfaces may simply be formed by pressing the material of the dial plate forwardly of and at an angle to the dial face as illustrated at 60 in Fig. 4. The source of illumination 65 and the several indicating pointers 66 are, with the latter pressed construction, positioned forwardly of the dial face. It will be further evident that the several indicia bearing surfaces may be formed in an additional manner by cutting along lines defining the two ends and bottom of each indicia bearing surface area and by bending forwardly the surface of the dial plate along a line defining the top and fourth boundary of each such area as illustrated at 67 in Fig. 5. The source of illumination 65 with this construction will be positioned forwardly of the dial plate 11 while the several indicating pointers 14, 15 are positioned either forwardly of the dial face, in the manner of the pointer 66 of Fig. 4, or are arranged to extend through the several louver-like apertures, as indicated in Fig. 5, suitably to cooperate with indicia provided on the several indicia bearing surfaces.

While I have shown a particular embodiment of my invention, it will, of course, be understood that I do not wish to be limited thereto since different modifications may be made both in the arrangement and structure of the individual elements which comprise my dial. I, of course, contemplate by the appended claims to cover any such modifications as fall within the true spirit and scope of my invention.

What I claim as new and desire to secure by Letters Patent of the United States is:

1. The combination, in a dial structure of a member having a dial face with an elongated aperture therein, a member integral with said first named member and having a surface positioned in opposing relation to and partially closing said aperture, said surface being inclined to said face and forming with said aperture a louver-like opening in said face, and indicia on said surface.

2. A structure including a member having a dial face and an elongated aperture in said face, a portion of said member being inclined to the plane of said dial face at one edge of said aperture and partially closing said aperture, said member having a surface in opposing relation to said aperture, and indicia upon said surface.

3. A radio dial structure comprising a dial face having an aperture therein, a panel in opposing relation to said aperture and having a surface inclined at an angle to said face, said panel being formed from the material of said face to present a louver-like aperture in said face, a scale upon said surface, means to illuminate said scale, and an index cooperating with said scale.

4. A radio dial structure comprising a member having a dial face and an aperture therein, a member integral with said first named member and having a surface inclined louver-like to said face, said surface being positioned in opposing relation to and partially closing said aperture, a scale upon said surface, means movable over said surface for indicating in cooperation with said scale a condition, and means positioned rearwardly of said face for illuminating said surface.

5. The combination, in a radio dial, of a dial plate having an inturned edge portion and having a dial face with louver-like apertures therein, a tuning scale adjacent each said aperture, supporting feet on said inturned edge portion, indicating means cooperating through said louver-like apertures with a respective one of said scales, and means utilizing said supporting feet for positioning said dial plate in relation to said indicating means.

6. A radio dial comprising, in combination, a dial plate having flanged edge portions and having a dial face, a plurality of spaced elongated louver-like apertures in said dial face, a tuning scale adjacent each said aperture, a base member, a plurality of feet secured to said flanged edge and arranged to support said dial plate in spaced relation to said base member, means on said base member for movably supporting an indicating pointer in cooperative relation with each of said tuning scales, additional means on said base plate for movably supporting a second indicator in cooperative relation to a selective one of said tuning scales, and means positioned rearwardly of said dial plate and forwardly of said base member for illuminating said tuning scales.

7. The combination, in a dial mechanism, of a dial plate having an elongated opening therein, said elongated opening being partially closed by a louver-like portion of said dial plate, said portion extending at an angle to the plane of said dial plate, indicia on said portion, and an index cooperating with said indicia.

8. The combination, in a dial mechanism, of a dial plate, said plate having an elongated aperture therein, a portion of said dial plate extending at an angle to the face of said plate and partially closing said aperture, indicia on said dial portion, an index projecting through said aperture into cooperative relation with said indicia, and a source of illumination arranged in back of said dial plate to illuminate said dial portion through said aperture.

9. In a dial mechanism, the combination of a dial plate having a surface portion bent at an angle to the face of said dial to form a louver-like aperture in said dial face, indicia on said surface portion, and an index extending through said aperture into cooperative relation with said indicia.

10. An instrument dial plate having a dial face with a substantially plane surface and a surface cut and bent therefrom to form a louver-like opening through said dial plate, and indicia upon said second named surface.

11. The combination, in a dial mechanism, of a dial plate having a surface portion formed from the material of said dial plate forwardly of and at an angle to the face of said plate, indicia on said surface portion, and an index cooperating with said indicia.

12. The combination, in a dial mechanism, of a dial plate having a surface portion bent forwardly of the face of said plate and at an angle thereto, indicia on said surface portion, an index movably arranged in cooperative relation with said indicia, and a source of illumination positioned forwardly of said dial plate to illuminate said indicia.

GEORGE A. BECK.

CERTIFICATE OF CORRECTION.

Patent No. 2,146,558. February 7, 1939.

GEORGE A. BECK.

It is hereby certified that error appears in the printed specification of the above numbered patent requiring correction as follows: Page 3, first column, line 10, after the word "be" insert noted; line 71, claim 1, after "structure" insert a comma; and that the said Letters Patent should be read with this correction therein that the same may conform to the record of the case in the Patent Office.

Signed and sealed this 28th day of March, A. D. 1939.

Henry Van Arsdale.

(Seal) Acting Commissioner of Patents.